March 13, 1956 A. BELLOMO 2,737,790
HOMOKINETIC BALL JOINTS
Filed Nov. 7, 1950
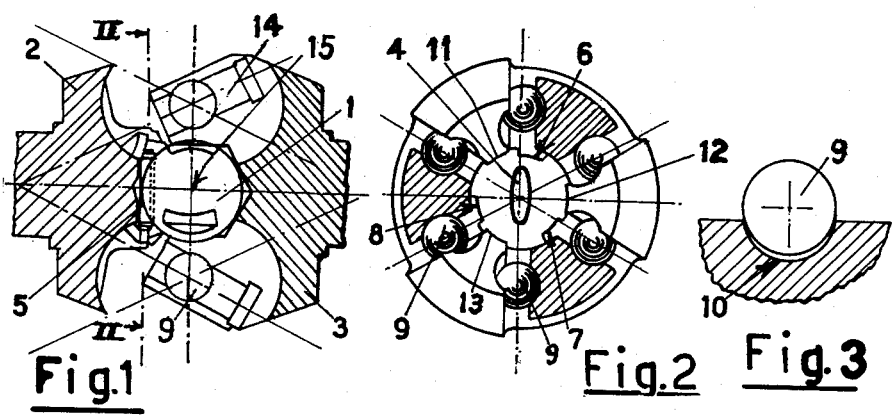

United States Patent Office 2,737,790
Patented Mar. 13, 1956

2,737,790

HOMOKINETIC BALL JOINTS

Andrea Bellomo, Milan, Italy

Application November 7, 1950, Serial No. 194,446

Claims priority, application Italy November 16, 1949

3 Claims. (Cl. 64—21)

The present invention relates to ball joints with constant angle velocity of the type wherein the two body members of the joint have a joining end portion forked into two or more interpenetrating and cooperating arms, between the said arms there being located four or more driving balls for the transmission of the motion and the torque. Each of said driving balls is engaged in associated raceways having a semicircular cross-section formed in the facing sides each pertaining to one of the two body members of the joint.

An object of this invention is to provide a connection of the two body members by means of a connecting ball member, which during the operation of the joint exerts its action being held in spherical seats formed in the arms of the two body members.

A further object is to provide a connecting ball member having grooves thereon, which permit the mounting of the connecting ball member in the spherical seats of the body members of the joint.

A still further object of the invention is to provide means which, after the connecting ball member is introduced in its seats and rotated so as to bring the spherical portion of the connecting ball member into contact with the said spherical seats, prevent the connecting ball member from rotating and separating from its seat.

A still further object of the invention is to provide a joint with constant angle velocity of the species indicated, wherein the driving balls have the diameter slightly greater than the diameter of the raceways wherewith they are engaged, so as to have the surface of the driving ball into contact with the bottom of each raceway only when the driving ball is forced into the raceway.

These and other objects of the invention will be apparent from the following description considered in connection with the accompanying drawing wherein:

Figure 1 is an axial section of a joint having six driving balls;

Figure 2 is a cross-section of the joint taken on the line II—II of Figure 1; and Figure 3 is a cross-sectional view showing a detail of the engagement between the raceway and the driving ball.

Referring now more particularly to Figures 1 and 2, there is shown for the purpose of illustrating this invention, a joint with constant angle velocity comprising two body members 2 and 3 which are one piece with the related shaft and are articulated for movement about the centre 15.

The body members 2, 3 of the joint are connected to each other by means of a central connecting ball 1, the centre of which coincides with the articulation centre 15.

In Figure 1, reference numeral 14 indicates the raceways or guiding grooves of semicircular cross-section, which engage the driving balls 9. In the present case the raceways 14 are rectilinear. The cross-section of each raceway (Fig. 3) is an arc having a diameter less than the diameter of the related driving ball, and consequently, when the joint is assembled, the axes of two associated raceways are proportionably distanced from the centre of the engaged driving ball.

Preferably, the radius of the cross-section of the raceway is smaller than the radius of the driving ball. Consequently, the driving ball 9 (Fig. 3) abuts on the edges of the raceway without contacting the bottom thereof unless it is forced thereinto. In general, during the mounting, all the driving balls are forced in the related raceway, so as to eliminate the gap shown in Figure 3. Such forced mounting is possible or much facilitated by simultaneously inserting all the driving balls in the related pairs of raceways and by frontally approaching the two body members of the joint.

The central connecting ball member 1 is provided with so many parallel assembling grooves such as 6, 7 and 8 as there are arms of each body member of the joint. Said grooves are equally angularly spaced on the central ball, so that on the surface of the central ball spherical zones are separated by recesses.

The inner surface of each arm facing the axis of the joint is provided with a spherical depression having a radius substantially equal to the radius of the central ball member 1; the assembling of all these spherical depressions forms the spherical seat for the central ball member 1, which is held by the contracted section of the projecting portions 11, 12 and 13 of the arms of the body members.

For the successive mounting of the central ball member 1 into its spherical seats to connect the two body members of the joint, the grooves 6, 7 and 8 are caused to face said projecting portions 11, 12 and 13 and the central ball member 1 is introduced into each of its spherical seats, the grooves being slightly larger than the projecting portions.

Then, the ball member 1 is rotated so as to bring the spherical zones thereof into contact with the inner spherical surface of the inner depressions of the arms of the two body members. To keep the ball member 1 in its position and to prevent it from rotating during the operation of the joint, the ball member 1 is retained by a piece or a pin 5, which is introduced in a further groove 4 of the ball member 1 and engages in any desired manner one of the two body members, for instance member 2. In general, pin 5 is inserted in the groove 4 and in a groove formed in one of the body members of the joint, means being provided to prevent the dropping out of the pin. Groove 4 has to be so arranged with respect to the grooves 6, 7 and 8 that the spherical surfaces of the depressions of the arms of the body member 3, contact during the greatest part of the angularly movement of the body member with the spherical zones of the ball member 1 and that the inner spherical surfaces of the depressions of the arms of the body member 2 at least partially contact with the spherical zones of ball member 1, as shown in Figure 2.

The assembling of a joint provided with such connection is in general performed by introducing, as above described, the central ball in the spherical seat formed in the innersurface of the arms of one of the two body members of the joint, then by disposing the central ball, that is the grooves 6, 7 and 8 thereof, so as to frontally approach the arms of the second body member, by simultaneously inserting and forcing into the grooves 14 the driving balls pre-arranged at the entrance of each groove or raceway 14 and lastly disposing the central ball so as to lock the two body members and to bring the groove 4, or else one of the mounting grooves, into the required position to insert the pin 5 which prevents the central ball from rotating with respect to one of the body members and the locking means for the pin 5.

Having now particularly described and ascertained the nature of my said invention and in what manner the same is to be performed, I declare that what I claim is:

1. A joint comprising, in combination, two body members movable between a position in which the respective axes of said two body members are aligned, and a plurality of positions in which the axes of said two body members define an angle, each of said two body members having an end portion forked into a plurality of equally spaced arms, the arms of each of said body members projecting into the spaces between the arms of the other of said two body members, each of said arms having an inner face and two lateral faces, each of said lateral faces of each arm located opposite a lateral face of another arm, each of said lateral faces being formed with an elongated guiding groove having semicircular cross-section, the guiding grooves in each pair of opposite lateral faces crossing each other, the inner faces of said arms of said body members being formed with depressed surface portions, said depressed surface portions of said arms forming together a spherical seat; a ball located between each pair of lateral faces at the crossing point of said guiding grooves in the same and fitting into said guiding grooves; a central ball located between said body members and having a spherical surface engaging in assembled position said spherical seat, said central ball being formed with a plurality of assembling grooves extending in axial direction of said body members, each of said assembling grooves corresponding to one of said arms and being in said assembled position staggered with respect to the same, said central ball member being turnable during assembly into a position in which said assembling grooves are aligned with said arms to permit axial insertion of said arms with said inner faces sliding in said assembling grooves; and means locking said central ball in said assembled position to one of said body members.

2. A joint comprising, in combination, two body members movable between a position in which the respective axes of said two body members are aligned, and a plurality of positions in which the axes of said two body members define an angle, each of said two body members having an end portion forked into a plurality of equally spaced arms, the arms of each of said body members projecting into the spaces between the arms of the other of said two body members, each of said arms having an inner face and two lateral faces, each of said lateral faces of each arm located opposite a lateral face of another arm, each of said lateral faces being formed with an elongated guiding groove having semicircular cross-section, the guiding grooves in each pair of opposite lateral faces crossing each other, the inner faces of said arms of said body members being formed with depressed surface portions, said depressed surface portions of said arms forming together a spherical seat, each of said body members having a transversal end face surrounded by said arms and located opposite the end face of the other of said body members, each end face being formed with a depressed spherical face extending symmetrically about the axis of the corresponding body member and facing the corresponding spherical face in the other of said body members; a ball located between each pair of lateral faces at the crossing point of said guiding grooves in the same and fitting into said guiding grooves; a central ball located between said transversal end faces of said body members and engaging said spherical faces in said end faces of the same, said central ball having a spherical surface engaging in assembled position said spherical seat, said central ball being formed with a plurality of assembling grooves extending in axial direction of said body members, each of said assembling grooves corresponding to one of said arms and being in said assembled position staggered with respect to the same, said central ball member being turnable during assembly into a position in which said assembling grooves are aligned with said arms to permit axial insertion of said arms with said inner faces sliding in said assembling grooves; and means locking said central ball in said assembled position to one of said body members.

3. A joint comprising, in combination, two body members movable between a position in which the respective axes of said two body members are aligned, and a plurality of positions in which the axes of said two body members define an angle, each of said two body members having an end portion forked into a plurality of equally spaced arms, the arms of each of said body members projecting into the spaces between the arms of the other of said two body members, each of said arms having an inner face and two lateral faces, each of said lateral faces of each arm located opposite a lateral face of another arm, each of said lateral faces being formed with an elongated guiding groove having semicircular cross-section, the guiding grooves in each pair of opposite lateral faces crossing each other, the inner faces of said arms of said body members being formed with depressed surface portions, said depressed surface portions of said arms forming together a spherical seat; a ball located between each pair of lateral faces at the crossing point of said guiding grooves in the same and tightly fitting into said guiding grooves; a central ball located between said body members and having a spherical surface engaging in assembled position said spherical seat, said central ball being formed with a plurality of assembling grooves extending in axial direction of said body members, each of said assembling grooves corresponding to one of said arms and being in said assembled position staggered with respect to the same, said central ball member being turnable during assembly into a position in which said assembling grooves are aligned with said arms to permit axial insertion of said arms with said inner faces sliding in said assembling grooves; and means locking said central ball in said assembled position to one of said body members.

References Cited in the file of this patent
UNITED STATES PATENTS

| | | |
|---|---|---|
| 1,774,578 | Weiss | Sept. 2, 1930 |
| 2,156,106 | Bill | Apr. 25, 1939 |
| 2,217,969 | Schairer | Oct. 15, 1940 |
| 2,525,695 | Lombard | Oct. 10, 1950 |